United States Patent [19]

Jiandani

[11] Patent Number: 4,549,691
[45] Date of Patent: Oct. 29, 1985

[54] DUAL MODE BELLOWS-ACTUATED THERMOSTATIC STEAM TRAP

[75] Inventor: Niranjan T. Jiandani, Emmaus, Pa.
[73] Assignee: Spirax Sarco, Inc., Allentown, Pa.
[21] Appl. No.: 569,977
[22] Filed: Jan. 11, 1984
[51] Int. Cl.[4] ............................................. F16T 1/02
[52] U.S. Cl. .................................... 236/58; 236/93 A
[58] Field of Search ................. 236/58, 93 A, 99 F, 236/99 J, 99 R; 251/86

[56] References Cited

U.S. PATENT DOCUMENTS

| | | | |
|---|---|---|---|
| 1,303,140 | 5/1919 | Yeiser | 236/99 J X |
| 2,975,974 | 3/1961 | Jackson et al. | 236/93 A X |
| 3,510,100 | 5/1970 | Makusay et al. | 251/86 X |
| 3,725,989 | 4/1973 | Reid et al. | 236/58 X |

Primary Examiner—William E. Tapolcai
Attorney, Agent, or Firm—Ruth Moyerman

[57] ABSTRACT

A thermostatic steam trap, which operates either as a blast trap or a liquid expansion trap, depending solely on reversal of inlet and outlet function, has a generally cylindrical housing containing an internal cavity. The housing has two parts, the first of which contains a passage leading to a valve seat and the second of which contains a passage leading, via a plurality of bores, to the cavity. Within the cavity is a bellows, filled with a volatile liquid, having a valve on its top which mates with the valve seat and connected at its bottom to the second housing part. The connection is pivotal to permit self-centering of the valve. Either passage can serve as an inlet depending on which operating modality is desired.

2 Claims, 7 Drawing Figures

DUAL MODE BELLOWS-ACTUATED THERMOSTATIC STEAM TRAP

BACKGROUND OF THE INVENTION

1. Field of the Invention

This invention relates to automatic steam traps of the type in which there is activation of a valve directly by a thermostat of the expanding fluid type. In more general parlance, it relates to bellows-actuated thermostatic steam traps. More particularly, it relates to a trap of this character which has a dual modality of operation.

2. Description of the Prior Art

As is known to those skilled in this art, the purpose of a steam trap is to vent air, or other noncondensables, and condensate from a steam pressure system without losing any steam. The most efficient trap is one which vents the maximum amount of air, noncondensables, and condensate under varying conditions of pressure and temperature.

Steam traps may be variously classified and differences of opinion exist as to the number of genre which exist and their names. For example, Gleason et al in U.S. Pat. No. 3,347,257 state that there are three general types (i.e. bucket, thermostatic or expansion, and thermodynamic). On the other hand, in "Hook-up Designs for Steam & Fluid Systems" (Sarco Company, Allentown, Pa. 7th ed-1981, pg 16 et seq) five different types are described, namely, (1) balanced pressure thermostatic, (2) liquid expansion, (3) float and thermostatic, (4) inverted bucket and (5) thermodynamic. Each of these traps has its strengths and its weaknesses. Yet their mutual exclusivity works an economic hardship on the process plant which must stock various types for various applications.

Consider, for example, the fact that in average chemical process plants and oil refineries there are two important uses for steam traps. They are used in connection with steam tracing of product lines, which must be heated to keep their contents at desired temperature and/or viscosity. They are also used for draining condensate from steam mains. These two uses, however, require different operating characteristics. In the draining of condensate from steam mains, the condensate is removed at approximately saturation temperature even though it contains significant sensible heat. This is so because the presence of condensate is undesirable and, under some conditions, hazardous. In the draining of steam tracing lines, however, condensate is removed at temperatures well below saturation in order to achieve maximum utilization of sensible heat. Accordingly, plants usually stock blast type traps, such as the thermostatic trap, for the first use and liquid expansion traps for the second use.

It would be desirable, therefore, to have a single trap which could perform functions traditional to both blast traps and liquid expansion traps. By this it is not meant merely to have a common housing with interchangeable internals but, rather, a trap which is truly operable in a dual mode.

The prior art in this field is legion. Still, U.S. Pat. No. 748,888 discloses a trap containing a diaphragm element and suggests inverting it to close the outlet instead of the inlet. There is no suggestion of what is achieved thereby. Smith et al, U.S. Pat. No. 1,467,818 is a conventional radiator trap which uses a ball valve outlet and a bellows. In Oakley et al, U.S. Pat. No. 1,934,205 a trap is disclosed which can be isolated for replacement of its thermostatic bellows. Irwin, U.S. Pat. No. 1,976,730 discloses a trap wherein blow off temperature can be adjusted over a wide range. However, despite the temperature setting the valve still functions as a blow off trap. Smith, U.S. Pat. No. 2,229,529 controls flow of condensate in one direction and steam in another by providing two mechanisms in a common housing. Clifford, U.S. Pat. No. 2,276,931 discloses a bellows which is unusually sensitive and requires less fluid than conventional devices. Morgan, U.S. Pat. No. 2,778,573 discloses a steam trap having a bellows and also a linked valve for providing two valving actions if pressure increases. Beatty, U.S. Pat. No. 4,134,541 discloses a trap which combines a thermostatic bellows trap with a restrictive orifice in parallel. Cycling of the bellows, which is characteristic of blow traps, is reduced by the continuous condensate path through the orifice. Hetz, U.S. Pat. No. 4,288,032 provides a "universal" trap body into which can be placed various types of trap elements. While some of the above patents recognize the existence of the problem, none postulates a solution as exemplified herein.

SUMMARY OF THE INVENTION

A duel mode bellows-actuated thermostatic steam trap is the subject of the invention. The two modes of operation are a blast mode, in which hot condensate is discharged until the appearance of steam, and a liquid expansion mode in which there is modulation of a stream of condensate having a temperature well below the equilibrium temperature for saturated steam.

The trap comprises a housing, which may be made from two mating housing portions, and which contains an internal chamber. In that chamber is located a bellows, having a top, a bottom and accordion sides. The bellows contains a volatile liquid whose saturation curve closely parallels that of saturated steam but is a few degrees below it. A valve is affixed to the center of the top of the bellows.

One of the mating housing portions contains a valve seat which works in conjunction with the valve on the bellows. This valve seat is annular and is the terminus of a passage which extends from the exterior of the housing portion along its longitudinal axis.

The other mating housing portion contains a bore extending on its longitudinal axis from its exterior toward the center but this bore divides into a plurality of smaller offset bores which are radially distributed in a circle around the longitudinal axis. On the longitudinal axis, proximate the chamber, there is provided an attachment face.

Means are provided for pivotally connecting the bottom of the bellows to the attachment face of the housing so that there is self-alignment of the valve and the valve seat as the bellows expands and contracts. These means may include a sphere centrally affixed to the bottom of the bellows and a hollow, internally shouldered, sleeve mounted on the attachment face with the sphere being permanently but rotatably retained within the sleeve. Frictional resistance to rotation can be increased by providing a spring within the sleeve, one end of which abuts the sphere.

When the passage in the first housing portion (i.e. the one having the valve seat associated with it) is used as an outlet, the trap functions as a blast trap and the liquid in the bellows cycles between a liquid state and a vapor state. However, when the "inlet" is used as the "outlet"

(i.e. when there is reversal of the entire trap) it functions in a liquid expansion mode and the liquid in the bellows vaporizes and thereafter expands and contracts as a function of perceived temperature.

The invention thus overcomes one of the problems of the prior art and, in a single steam trap, allows the user either blast operation or liquid expansion operation by a mere reversal of the trap and exchange of inlet and outlet designations.

BRIEF DESCRIPTION OF THE DRAWING(S)

In the drawings, wherein like numerals designate like parts:

DETAILED DESCRIPTION OF THE PREFERRED EMBODIMENT(S)

Figure 1:
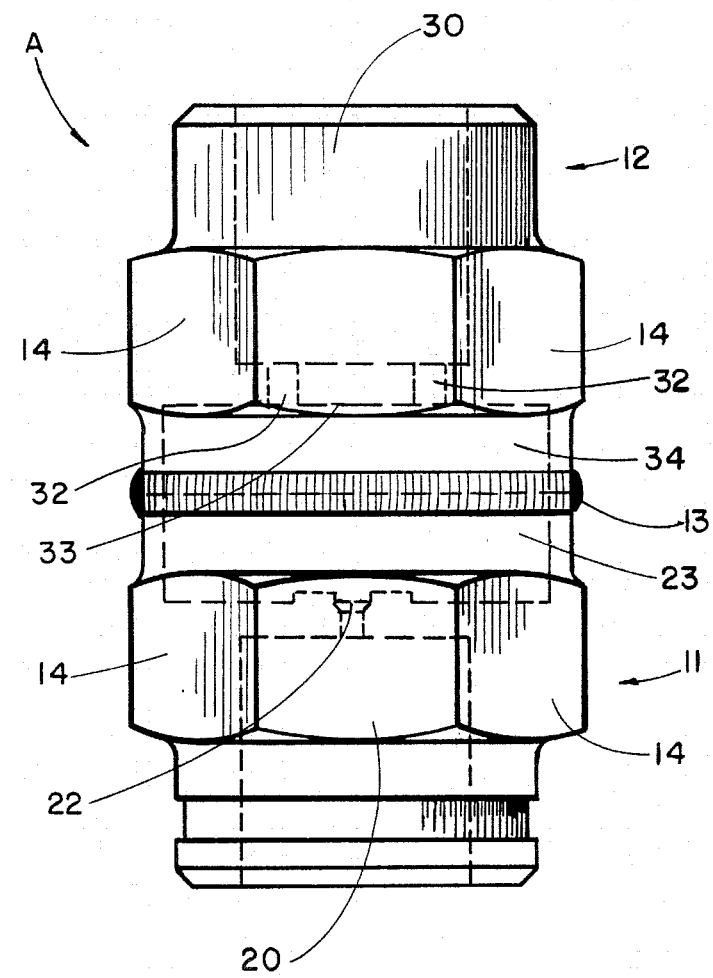
FIG. 1 represents an elevation of a trap embodying the invention.

Referring to FIG. 1, a dual mode bellows-actuated thermostatic steam trap is shown therein as A. It includes, in this embodiment, a first housing portion 11 and a second housing portion 12. While the two housing portions are shown here joined by a weld 13, they may be variously joined using, for example, threads or flanges. Both housing portions may be provided with octagonal faces 14 which make for ease of pipe fitting and installation.

First housing portion 11, as particularly seen in FIGS. 2-5, has a passage 20, which may be provided with internal threads 21, extending from its exterior to its interior. This passage terminates in a valve seat 22, which is located on its longitudinal axis at the point where the passage enters the hollow interior 23 of the housing.

Second housing portion 12, as particularly seen in FIGS. 2-5, has a longitudinal passageway 30 extending from the exterior toward the interior. At one end, the passageway may be provided with internal threads 31. Proximate its other end, passageway 30 divides into a plurality of smaller offset bores 32, which are radially distributed around the longitudinal axis of the housing. Bores 32 terminate in the hollow interior 34 of housing portion 12. Centrally located around the longitudinal axis of the housing, and in general transverse alignment with the termini of bores 32, is a bellows attachment face 33.

When assembled, the two housing portions create an internal chamber 40 within which is provided a bellows, generally 41, having a top 42, a bottom 43 and accordion sides 44. This bellows is filled with a volatile liquid whose saturation curve closely parallels but is a few degrees below that for saturated steam. For example, a fluid may be used whose pressure-temperature, relationship closely parallels, but is approximately 10 degrees F. (5.6 deg. C.) below that of steam—(i.e. its boiling point at 0 psig is 202 degrees F. v. water at 212 degrees F.; at 100 psig 328 degrees F. for the fluid v. 338 degrees F. for water). Various alcohols and mixtures thereof may be used, but the preferred liquid is n-propanol.

A valve, 45, shown in this embodiment as spherical, is centrally mounted on top 42 and is in operative contact with seat 22, when the bellows 41 expands. Bellows bottom 43 adjoins bellows attachment face 33 and must be secured to it. This is preferably done with pivotal attachment means, so that there will be self-alignment of the valve and seat as the bellows goes through cycles of expansion and contraction. One such means utilizes a sphere 46, which is suitably affixed to the bottom 43 at the center thereof. Face 33 is provided with a hollow sleeve 47, having an internal shoulder 48. Sphere 46 fits closely into sleeve 47 and abuts shoulder 48. It may be variously detented in the sleeve, as by crimping the outer sleeve rim after sphere insertion. The sphere is thus rotatably retained. If it is desired to increase friction, a spring such as helix 49 may be provided, one end of which abuts the sphere. The bellows, sphere and sleeve may be pre-assembled and pressed into a hole provided in face 33 as part of a total assembly operation.

Figure 6:
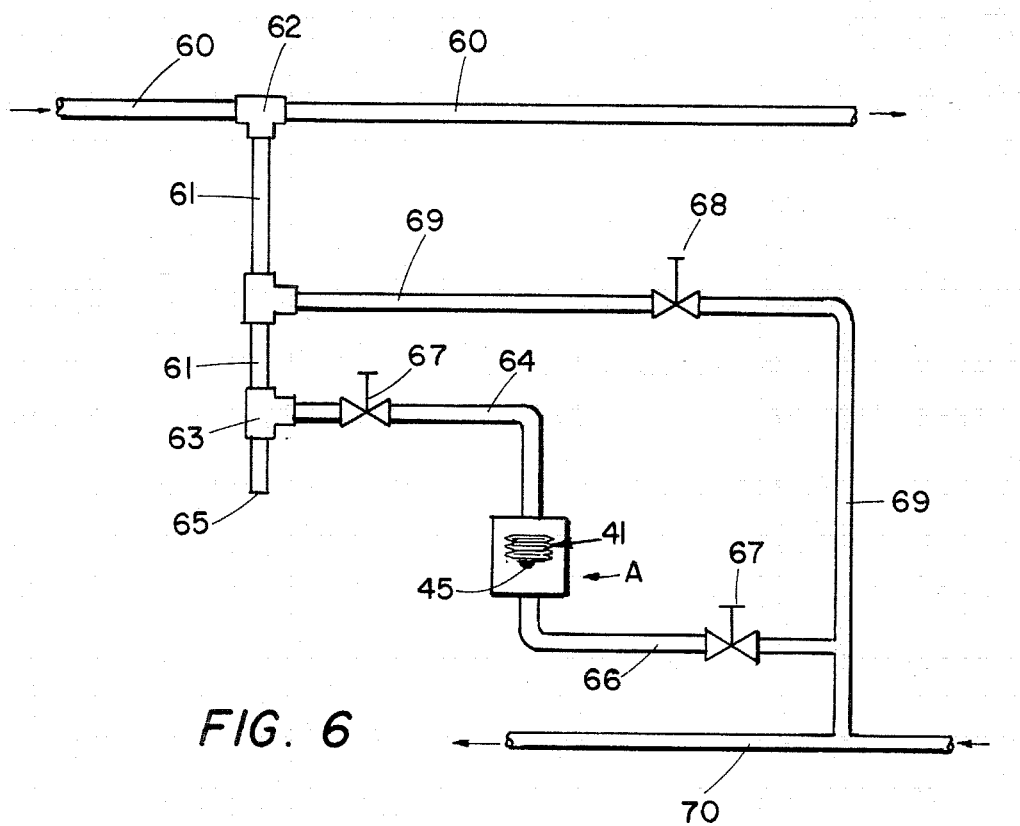
FIG. 6 is a simplified diagramatic representation of the use of a trap of the invention, in its blast mode, in conjunction with a steam main.

Operation of the trap of the invention in its blast mode will be explained with reference to FIGS. 2, 3 and 6. Shown in FIG. 6, diagramatically, is a conventional steam main system. This includes a steam main 60 shown running horizontally. A condensate collecting leg 61 drops down from the main and is connected to it with a "T" 62. At the bottom of the collecting leg there is a dirt pocket 65. A "T", 63 links the collecting leg 61 to trap A, via line 64. An outlet line 66 carries condensate from trap A into by-pass line 69 and thence to condensate return line 70. Customary isolation valves 67 are shown in the inlet and outlet lines, and these valves permit the trap to be removed or serviced. Further, a by-pass valve 68 is shown in by-pass line 69. The valve is opened wide on start-up to allow the steam main to reach desired temperature. Thereafter, the valve is shut and the trap begins to function. Strainers and other customary fittings are not shown, since this type of general arrangement is conventional. What is not conventional is trap A. Flows through the steam line and the condensate return are indicated by directional arrows.

Figure 2:
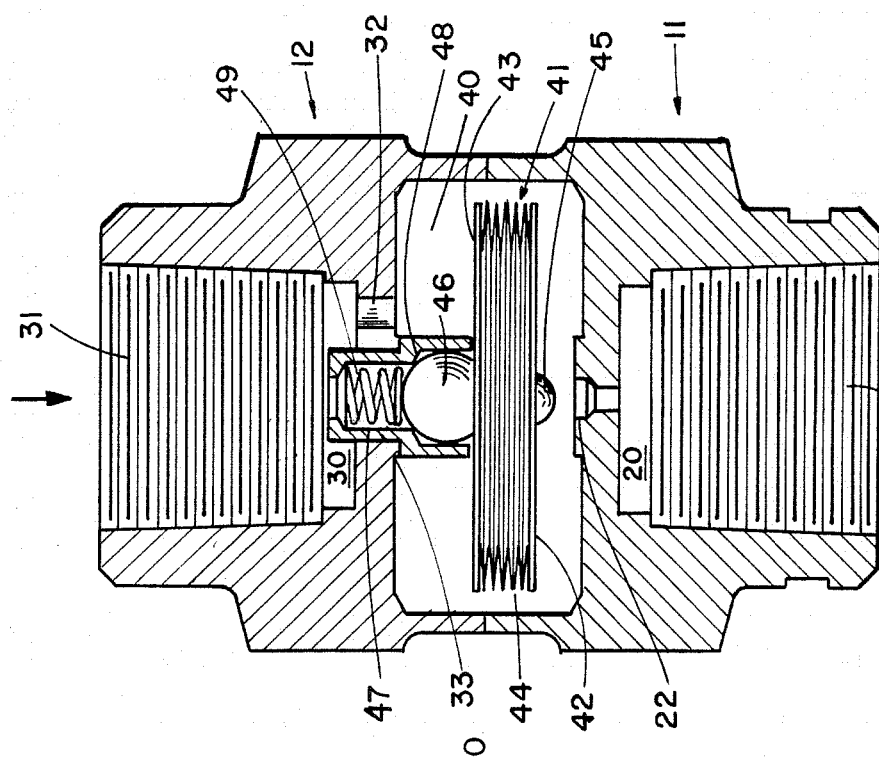
FIG. 2 is a section through a trap of the invention, with the bellows in elevation, which illustrates operation of the trap in its blast mode, with the valve closed.
Figure 3:
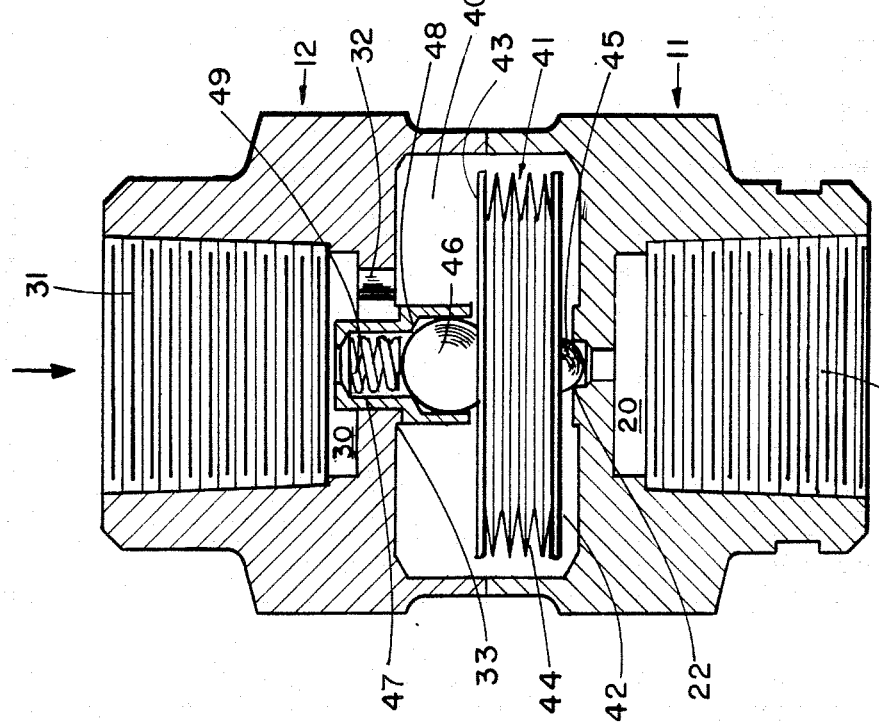
FIG. 3 is a section, identical to that of FIG. 2, except that the valve is fully open.

In FIGS. 2 and 3, the arrows at the top of passageway 30 indicate these same flows. That is, condensate flows through the passageway and into chamber 40 before reaching the valve. The chamber thus has an environment which is reflective of pressure and temperature conditions in collecting leg 61.

When cold, the trap is wide open, as shown in FIG. 3, freely discharging air, non condensables and cool condensate. As the condensate temperature reaches a few degrees Farenheit (e.g. 10 degrees) below saturated steam temperature, the filling liquid creates an internal pressure in the bellows. When the condensate temperature approaches that of steam, the internal pressure exceeds the external pressure and the bellows expands, driving the valve head to its seat, as shown in FIG. 2, and thus closing the trap. As the condensate surrounding the bellows cools, the vaporized fill liquid within the bellows condenses, reducing the internal pressure. The bellows contracts, opening the trap for discharge in FIG. 3 configuration. The thermostatic trap illustrated is, in this modality, a blast type trap cycling from a full open to a full closed position.

Figure 4:
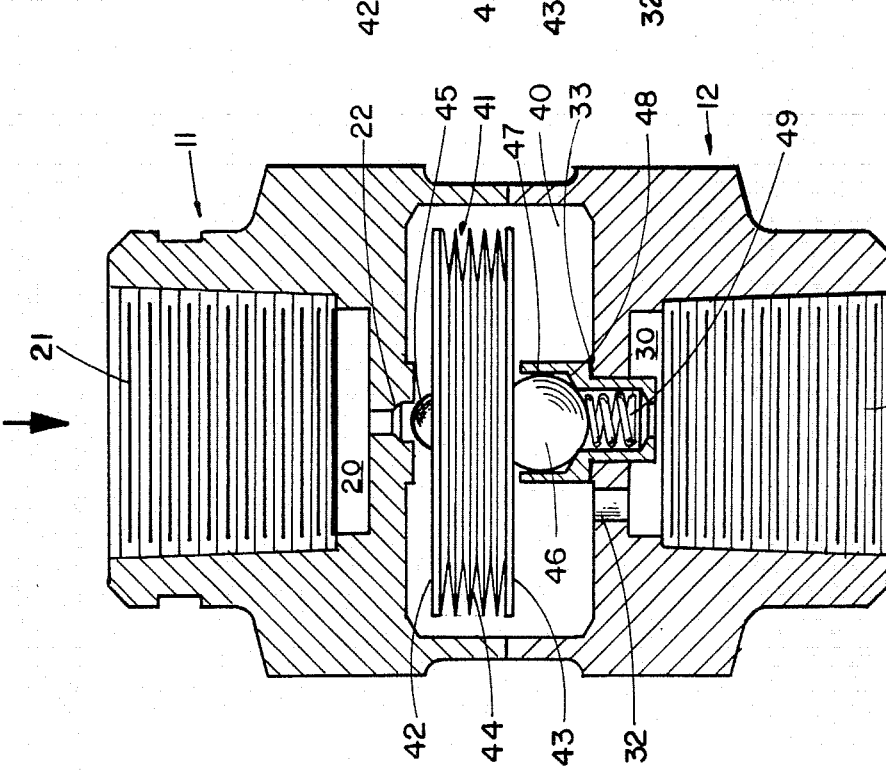
FIG. 4 is a section through a trap of the invention, with the bellows in elevation, which illustrates operation of the trap in its liquid expansion mode and the valve throttled down.
Figure 7:
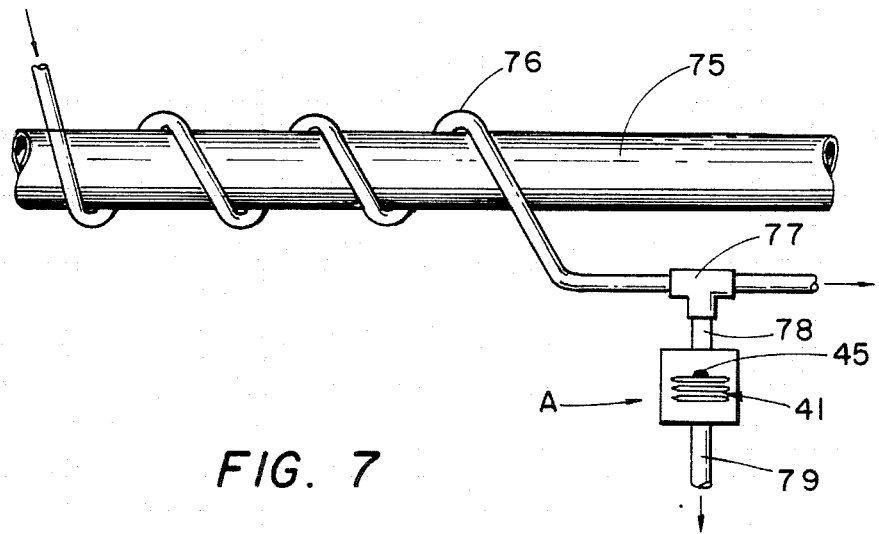
FIG. 7 is a simplified diagramatic representation of the use of a trap of the invention, in its liquid expansion mode, in conjunction with a steam traced product line.

Operation of the trap of the invention in its liquid expansion mode will be explained with reference to FIGS. 4, 5 and 7. Shown in FIG. 7 is a conventional, albeit simplified, steam tracing hook-up. A product line 75 is traced with a helical steam tracing line 76 in which, proximate the location of trap A, there is inserted a "T" 77. Line 76 terminates in a drain valve (not shown), downstream of "T" 77. Inlet line 78 connects to the trap and effluent is discharged at atmospheric conditions through line 79. Flows through trace line 76 are indicated by arrows, as is the discharge direction from line 79. Arrows are also used in FIGS. 4 and 5 to indicate these same flow directions. It is important to note that, in this configuration, valve 45 is interposed between chamber 40 and the steam line. Thus conditions in chamber 40 are ambient conditions (e.g. atmospheric) rather than line conditions.

Figure 5:
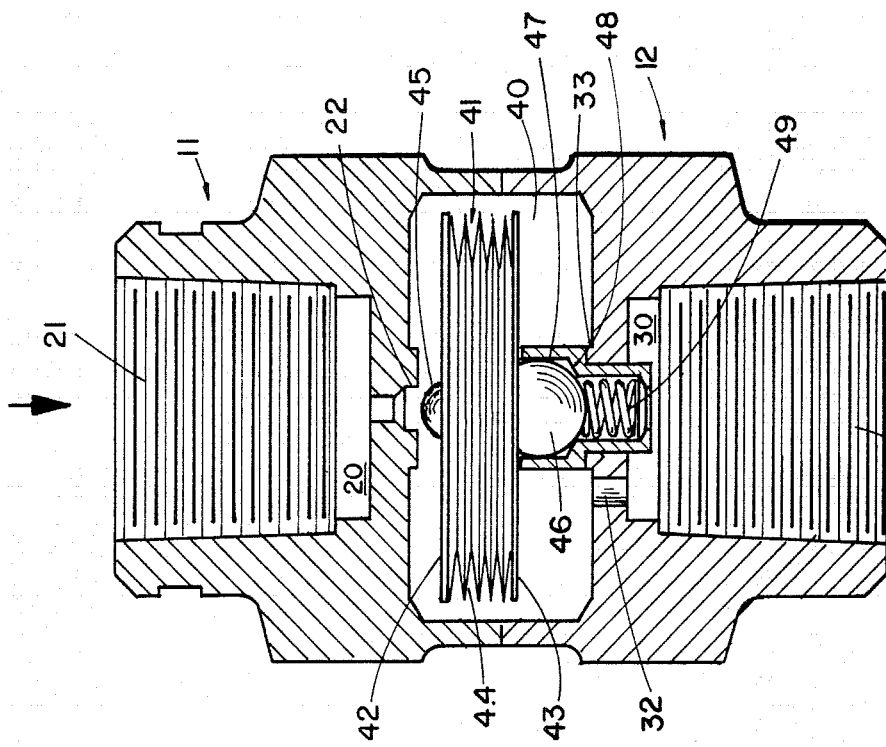
FIG. 5 is a section, identical to that of FIG. 4, except that the valve is in the modulated open position.

Upon start up, the trap A is open, as generally shown in FIG. 5, freely discharging air noncondensables and cool condensate until the condensate reaches a predetermined temperature below 212 degrees F. As the hot condensate flows over the bellows 41, it expands pushing the valve toward its seat, as shown in FIG. 4, thus throttling flow. The discussion of this modality is not intended to be stated in absolutes. Since it is liquid expansion within the bellows which is being discussed, it should be realized that relatively small volumetric changes are being considered as compared to the gross changes occuring with a change of phase. Consequently, what occurs in this type of operation is a continuous search for equilibrium which results in a modulated discharge from the trap (i.e. increased and reduced flow but always some flow) once initial heat-up has occured. This distinguishes over the blast type operation previously described and is attributable to the differences in environment in chamber 40. The valve movement as between FIGS. 4 and 5 is relatively small, on the order of small fractions of an inch, but such relatively small movement is enough to produce the desired results.

While only one embodiment of the invention has been herein shown and described, it will be apparent to those skilled in the art that the construction and arrangement of parts may be in other ways variously embodied or changed without departing from the scope of the invention as defined in the appended claims.

What is claimed is:

1. A dual mode bellows-actuated thermostatic steam trap comprising:
    (a) a first, generally cylindrical housing portion, having a hollow interior, said housing portion including a passage extending from the exterior to the interior thereof along its longitudinal axis, said passage terminating in a valve seat located at the point where it enters said hollow interior;
    (b) a second, generally cylindrical housing portion, also having a hollow interior, mounted in mating co-axial juxtaposition to said first housing portion to define therewith a housing having an internal chamber, said second housing portion being provided with a longitudinal passageway extending from exterior to interior, and a bellows attachment face located on the longitudinal axis of said housing portion proximate the terminus of said passageway, said passageway beginning as a single bore and dividing into a plurality of smaller offset bores which are radially distributed about said bellows attachment face;
    (c) a bellows having a top, a bottom and accordion sides located within said internal chamber, the interior of said bellows containing a volatile liquid whose saturation curve closely parallels but is a few degrees below that for saturated steam, the top of said bellows containing a valve which is in operative contact with the valve seat of said first housing portion and the bottom of said bellows being proximate said bellows attachment face;
    (d) a sphere centrally affixed to the bottom of said bellows and a hollow, internally shouldered, sleeve mounted on said attachment face, said sphere being permanently but rotatably retained within said sleeve to provide pivotal connection of said bellows and to assure longitudinal self-alignment of said valve and said valve seat as the bellows expands and contracts;
    whereby, when the passage in the first housing portion is utilized as an outlet, the trap operates in a first mode but, when said trap is reversed with said passage being utilized as an inlet, the trap operates in a second mode.

2. The steam trap of claim 1 wherein said sleeve also contains a spring, one end of which abuts said sphere and imparts additional frictional resistance to rotation.

* * * * *